United States Patent

[11] 3,600,694

[72] Inventor James H. McCollum, Jr.
Cedar Rapids, Iowa
[21] Appl. No. 31,895
[22] Filed Apr. 27, 1970
[45] Patented Aug. 17, 1971
[73] Assignee Collins Radio Company
Cedar Rapids, Iowa

[54] POWER NORMALIZATION OF ANGULAR INFORMATION FROM THREE-WIRE SYNCHRO SOURCE
7 Claims, 1 Drawing Fig.

[52] U.S. Cl. ..................................................... 329/50,
318/654, 325/476, 328/133, 328/155, 329/135,
329/146
[51] Int. Cl. ..................................................... H03d 3/18
[50] Field of Search.......................................... 329/135,
137, 50, 146; 328/133, 155; 325/476; 318/654,
655, 633

[56] References Cited
UNITED STATES PATENTS
| | | | |
|---|---|---|---|
| 2,580,148 | 12/1951 | Wirkler ......................... | 329/146 X |
| 3,050,728 | 8/1962 | Worley ......................... | 328/133 X |
| 3,265,904 | 8/1966 | Spencer ......................... | 328/133 X |

Primary Examiner—Alfred L. Brody
Attorneys—Richard W. Anderson and Robert J. Crawford ABSTRACT: An angle defining synchro output signal is subject to variation stemming from synchro induced phase shift and transformation ratio variations between units, as well as by variations in carrier excitation source amplitude. By converting a three-wire synchro output to respective carrier signals modulated by sine and cosine functions of the synchro signal information angle, demodulating each synchronously with respect to a signal phased in accordance with one of the sine and cosine modulated signals, and subsequently dividing the demodulator outputs, an output signal proportional to the ratio of the sine and cosine functions of the angle is obtained which is not affected by changes in synchro phase shift, transformation ratio, and carrier energization magnitude.

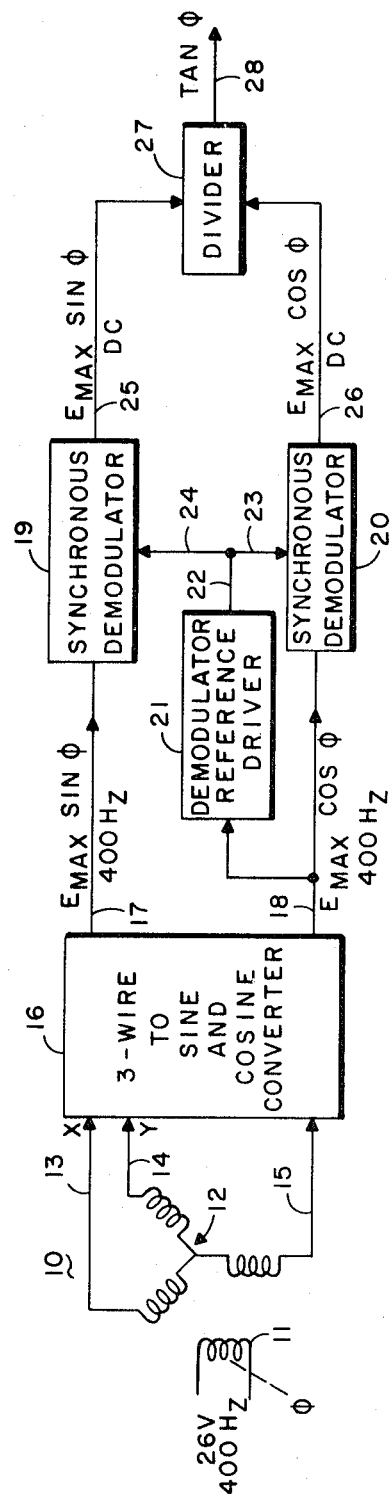

POWER NORMALIZATION OF ANGULAR INFORMATION FROM THREE-WIRE SYNCHRO SOURCE

This invention relates generally to the derivation of angular information from a three-wire synchro signal source and more particularly to the development of angular information output signal from such a three-wire source by a means which eliminates errors due to applied voltages, phase shift, and transformation ratios. The synchro is a well-known device providing three-wire output information the relative amplitudes and phase relationships of which are definitive of the angular orientation of the synchro rotor winding with respect to a three-phase stator winding. The present invention relates particularly to applications of three-wire synchros utilized to provide position information to control system and wherein it is desirable to eliminate variations in gain due to variations in synchro excitation voltage, variations in transformation ratios between various synchro units which might be employed in a given circuitry, and variations due to phase shift through the synchro.

The object of the present invention is accordingly the provision of a circuitry to develop an output signal which is a function of three-wire synchro input angular information signal and to develop the signal in such a manner as to eliminate signal variations due to power changes, transformation ratio changes and phase shifts.

The present invention is featured in provision of means for converting the three-wire synchro information to respective sine and cosine information signals and utilizing one of the sine and cosine information signals as a reference driving source for synchronous demodulation processes performed on the quadrature signals for elimination of errors due to phase shift. The synchronously demodulated quadrature signals are subsequently divided to provide an output signal proportional to the tangent of the input angular information, i.e. tangent $\Phi$, the dividing process eliminating the variations attributed to a function of synchro excitation voltage per se and the transformation ratio of the synchro.

These and other features and objects of the present invention will become apparent upon reading the following description with reference to the drawing in which the single FIGURE is a functional diagram of a power normalization circuitry for a three-wire synchro source in accordance with the present invention.

Numerous implementations are known in the art wherein three-wire synchro signals are converted to a single (two-wire) output proportional to the information angle per se or a given trigonometric function of the information angle defined collectively by the amplitudes and phases of the three-wire synchro output signal. In systems where the output information angle, or a function of this angle, must be extremely accurate, errors due to variations in the synchro excitation voltage, transformation ratios between various synchro units which might be employed, and phase shift through the synchro may be intolerable. The present invention extracts an output information signal in the form of trigonometric function of the angle collectively defined by the three-wire synchro input signal which is immune to these sources of error.

With reference to FIG. 1, a synchro 10 comprising a rotor 11 and three-phase stator winding 12 develops outputs 13, 14, and 15, the comparative instantaneous amplitudes and phase relationships of which collectively define the angular relationship $\Phi$ between the rotor 11 of the synchro and the stator winding 12. A source of 26-volt 400-Hz. cycle excitation (carrier) signal might be applied to the rotor 11. For the purpose of the present invention the three-wire output information 13—14—15 is applied to a three-wire to sine and cosine converter circuitry 16. The converter 16 might comprise, for example, a Scott-T transformer which receives a three-wire synchro signal and converts the signal to first and second outputs 17 and 18 respectively proportional to the sine and cosine of the angle $\Phi$. Thus in FIG. 1 the output 17 from the converter 16 is designated $E_{max} \sin \Phi$ while the output 18 from the converter 16 is designated $E_{max} \cos \Phi$. Outputs 17 and 18 would comprise 400-Hz. carrier signals amplitude modulated in proportion to sine $\Phi$ and cosine $\Phi$ respectively.

Output signals 17 and 18 from converter 16 thus comprise two signals which are proportional to the applied power ($E_{max}$) and the angular position of the synchro ($\Phi$). These two outputs are applied to separate synchronous demodulators 19 and 20 which convert the 400-Hz. amplitude modulated carrier signals to DC signals. The conversion or synchronous demodulation to DC signals is made with respect to the 400-Hz. reference frequency by generating a demodulator reference signal from the output signal 18 from converter 16 which is amplitude modulated in accordance with cosine $\Phi$. Accordingly output 18, proportional to $E_{max}$ cosine $\Phi$, is applied as an input to synchronous demodulator 20 and also as an input to a demodulator reference driver 21.

The reference driver 21 might comprise any one of a number of operational amplifier implementations which converts the applied signal to a square wave output signal which switches at the zero crossings of the 400-Hz. carrier applied. The output from the reference driver 21 is accordingly a square wave signal the phase of which is precisely defined by the 400-Hz. carrier signal. This reference process (as opposed to use of the carrier source per se for reference) eliminates errors due to phase shift between the 400-Hz. input to the synchro 10 and the 400-Hz. output signal from the synchro.

The synchronous demodulators 19 and 20 might be any one of a number of synchronous implementations which function as a suppressed carrier demodulators and provide a DC output proportional to the amplitude of the modulated input signal with the polarity of the output being a function of the phase relationship of the input signal and the injected carrier signal. In the present instance, the latter signal is the output 22 from the demodulator reference driver circuit 21.

The outputs from the two synchronous demodulators 19 and 20 ($E_{max} \sin \Phi$ and $E_{max} \cos \Phi$, respectively) are applied as respective inputs 25 and 26 to a divider circuitry 27, the function of which is to perform the computation $E_{max}$ sine $\Phi / E_{max}$ cosine $\Phi$ = tangent $\Phi$.

The division process performed by divider 27 eliminates the $E_{max}$ reference information and leaves only the angular position information in the form of the tangent of the angle $\Phi$. By eliminating the $E_{max}$ reference (which is a function of the synchro excitation voltage and the transformation ratio of the synchro) variations due to these two parameters are eliminated, leaving only angular position information.

Obvious limitations to the above defined technique exist due to the nature of the tangent function. In a typical utilization, the operation of this system might normally be restricted to angles of (0±45) or (180±45) degrees. This range, however, is more than adequate for many applications, for example, the use of such a circuit in an aircraft guidance roll angle reference signal development in a system where the aircraft is normally never commanded to a roll attitude greater than ±45°.

For this reason the demodulator reference driver utilizes the $E_{max}$ cosine $\Phi$ output 18 from the converter 16 since, over the range of operation, the cosine function of $\Phi$ does not change sign and the modulated carrier signal proportional to $E_{max}$ cosine $\Phi$ (output 18 from converter 16) does not change phase or go through zero between values of $\Phi$ between ±90°. Obviously should the sine $\Phi$ proportional signal 17 from converter 16 be utilized as the demodulator reference driver input, there would be no reference drive signal for values of $\Phi=0°$ (or 180°) since the since function is zero and the magnitude of the output 17 from converter 16 would be at these values of $\Phi$. Operation about 90° or 270° results in a sine function which is not zero, but the tangent function would be discontinuous at these points.

Over the range of operation in a typical system such as, for example, −45° to +45° about 0° the output 25 from synchronous demodulator 19 which receives the sine proportional input signal is of positive polarity between the values of Φ between 0° and +45° and of negative polarity due to a phase reversal in the 400-Hz. carrier signal carrying the sinusoidal modulation for values of Φ between 0° and −45°.

Thus, the outputs 25 and 26 from the respective synchronous demodulators, when divided in divider 27, develop an output 28 proportional to tangent Φ, the sign of which is positive for values of Φ greater than 0° and is negative for values of Φ less than 0°. The output 28 is thus a true analog output as concerns the tangent function of the angle Φ defined by the three-wire synchro input. The output 28 is devoid of errors which might normally be introduced due to variations in applied synchro excitation voltage, phase shift within the synchro and variation in transformation ratios between different synchros employed in a given implementation.

Although the present invention has been defined with respect to a particular embodiment thereof, it is not to be so limited as changes might be made therein which fall within the scope of the invention as defined by the appended claims.

I claim:

1. Means for extracting angular output information from a synchro angular information signal, comprising signal conversion means receiving said synchro signal as an input thereto and developing first and second output signals respectively proportional to the sine and cosine function of the angular information defined by said synchro signal, said synchro signal and the outputs from said conversion means comprising carrier signals the amplitude modulation and carrier phases of which define said angular information, a first synchronous demodulator means receiving said first converter output signal as a first input thereto, a second synchronous demodulator receiving said second converter output signal as a first input thereto, a demodulator reference driver circuitry receiving said second converter output signal and developing an output with phase corresponding to one said converter output signals, means for applying the outputs from said demodulator reference driver circuitry as respective second inputs to each of said first and second synchronous demodulators, said synchronous demodulators being adapted to provide a direct current voltage output signal the magnitude of which is proportional to the modulation component of the first input thereto and the polarity of which is a function of the phase relationship between carrier component of the first input thereto and the output from said demodulator reference driver circuitry, signal dividing means, means for applying the outputs from said first and second synchronous demodulators as respective inputs to said signal dividing means, the output from said dividing means being proportional to the quotient of the output from said first synchronous demodulator divided by the output from said second synchronous demodulator whereas the output from said dividing means is proportional to the tangent of the angular information angle defined by said synchro input signal and is substantially unaffected by variations in amplitude of the energizing carrier signal source, by variations between transformation ratios of different ones of said synchro input sources which might be connected in circuit therewith, and by phase shift in said synchro.

2. Means for converting a three-wire synchro input signal comprised of first, second, and third signal lines, the relative signal amplitudes between pairs of said lines and phases of voltage induced in said lines being collectively definitive of an information angle Φ, means for converting said three-wire angular information input signal to first and second angular information signals respectively proportional to the sine and cosine functions of said information angle Φ, means for demodulating each of said first and second last defined signals against a phase reference based on the phase of said signal proportional to cosine Φ wherein first and second direct current voltage signals the amplitudes of which are respectively proportional to sine and cosine of the information angle Φ are developed, and means for dividing said last named sine proportional signal with said last named cosine proportional signal to develop an output signal the magnitude of which is proportional to the tangent of said angular information signal Φ, said output signal being unaffected by variations in synchro transformation ratios, by variations in the magnitude of the energizing carrier signal source for said synchro signal, and by phase shift in said synchro.

3. Means as defined in claim 1 wherein said information angle Φ equals $\pm n\pi + \theta$ and $\pm n\pi - \theta$, where $n$ is an integer including the integer zero and $\theta$ is less than 90°.

4. Means as defined in claim 2 wherein said information angle Φ equals $\pm n\pi + \theta$ and $\pm n\pi - \theta$, where $n$ is an integer including the integer zero and $\theta$ is less than 90°.

5. Means as defined in claim 1 wherein the angle defined by said synchro input signal varies between 0° or 180° plus or minus a predefined angle $\theta$, where $\theta$ is greater than 0° and less than 90°.

6. Means as defined in claim 2 wherein the angle defined by said synchro input signal varies between 0° or 180° plus or minus a predefined angle $\theta$, where $\theta$ is greater than 0° and less than 90°.

7. Means for converting a three-wire synchro input signal comprised of first, second, and third signal lines, the relative signal amplitudes between pairs of said lines and phases of voltage induced in said lines being collectively definitive of an information angle Φ, means for converting said three-wire angular information input signal to first and second angular information signals respectively proportional to the sine and cosine functions of said information angle Φ, means for demodulating each of said first and second last defined signals against a phase reference based on the phase of at least one of said signals proportional to sine Φ and cosine Φ wherein first and second direct current voltage signals the amplitudes of which are respectively proportional to sine and cosine of the information angle Φ are developed, and means for deriving the ratio of said last named signals to develop an output signal the magnitude of which is proportional to an angular function of said angular information signal Φ, said output signal being unaffected by variations in synchro transformation ratios, by variations in the magnitude of the energizing carrier signal source for said synchro signal, and by phase shift in said synchro.

UNITED STATES PATENT OFFICE
CERTIFICATE OF CORRECTION

Patent No. 3,600,694　　　　　　　　　Dated August 17, 1971

Inventor(s) James H. McCollum, Jr.

It is certified that error appears in the above-identified patent and that said Letters Patent are hereby corrected as shown below:

Column 1, line 7, after "of" insert -- an --; line 16, after "to" insert -- a --; line 24, after "of" insert -- a --. Column 2, line 68, "since" should read -- sine --; line 69, after "be" insert -- zero --.

Signed and sealed this 27th day of June 1972.

(SEAL)
Attest:

EDWARD M. FLETCHER, JR.　　　　　　ROBERT GOTTSCHALK
Attesting Officer　　　　　　　　　　Commissioner of Patents